United States Patent Office 3,300,496
Patented Jan. 24, 1967

3,300,496
DERIVATIVES OF PYRIMIDINE-5-CARBOXYLIC
ACID
Peter F. Juby, Syracuse, N.Y., assignor to Bristol-Myers
Company, New York, N.Y., a corporation of Delaware
No Drawing. Filed Dec. 27, 1965, Ser. No. 516,664
2 Claims. (Cl. 260—256.4)

This application is a continuation-in-part of my prior, copending application Serial No. 468,941, filed July 1, 1965, and now abandoned.

This invention relates to certain novel compounds useful as anti-inflammatory agents and, more particularly, to 4 - (2,6 - dichloro - 3 - methylanilino)pyrimidine - 5 - carboxylic acid and its salts.

It was the object of the present invention to provide novel and nontoxic anti-inflammatory agents.

The object of the present invention has been achieved by the provision, according to the present invention, of an acid of the formula

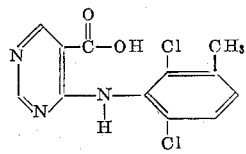

and nontoxic, pharmaceutically acceptable salts thereof; and of processes for the preparation thereof.

The compounds of the present invention are prepared in the form of esters by the reaction of 4-chloro-5-ethoxycarbonylpyrimidine (Chem. Ber. 95, 803 (1962)) with 2,6-dichloro-3-methylaniline, preferably by heating, as to reflux, in an inert solvent such as benzene. Roughly two moles of the aniline are used per mole of the pyrimidine or, if desired, equimolar amounts are used with the addition of a mole of a typical hydrogen halide acceptor such as a tertiary amine or an alkali metal carbonate. In the former case, a mole of the aniline hydrogen halide precipitates by the end of the reaction and is removed, as by filtration. The reaction product is isolated by such means as filtration or freeze-drying or evaporation of the solvent in vacuo. In another and preferred procedure, the substituted aniline is first converted to a sodio derivative by reaction with a metal hydride, e.g. sodium hydride, in an inert, dry solvent such as dimethylformamide and then the sodio derivative is reacted at an elevated temperature, e.g. 120° C., with the 4-chloro-5-ethoxycarbonylpyrimidine.

The ethyl ester so-produced is easily saponified in the usual manner, e.g. with aqueous potassium hydroxide, to give the free acid.

An additional, improved method for preparing the acid of the present invention, first as an alkali metal salt, utilizes the following reaction scheme:

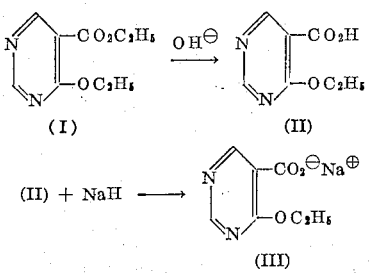

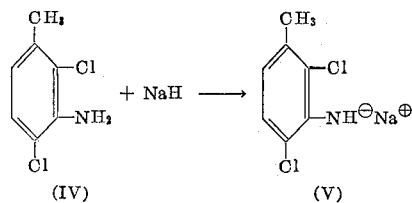

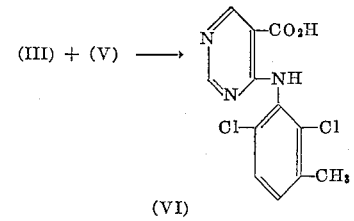

Thus in the final step substantially equimolar weights of an alkali metal, e.g. sodium, salt of 5-carboxy-4-ethoxy-pyrimidine and an alkali metal derivative, e.g. the sodio compound, of 2,6-dichloro-3-methylaniline are heated (e.g. at a temperature in the range of 50–150° C. and preferably at about 120° C.) in an inert organic solvent (preferably hexamethylphosphoric acid triamide) until the reaction is substantially complete, e.g. 18 hours. This reaction is preferably conducted in an inert atmosphere, e.g. under nitrogen.

Typical examples of nontoxic, pharmaceutically acceptable salts include the salts of the alkali metals, the alkaline earth metals, ammonia and substituted ammonia, i.e. amines.

As used herein the term "(lower)alkyl" signifies monovalent aliphatic radicals, whether branched or unbranched, which contain from one to six carbon atoms, inclusive, e.g. methyl, ethyl, propyl, isopropyl, n-butyl, sec.-butyl, tert.-butyl, isobutyl, n-hexyl, isohexyl, etc.

Anti-inflammatory tests of the compound of the present invention were carried out on rats using the carrageenin-induced foot edema test of Charles A. Winter et al., Carrageenin-Induced Edema in Hind Paw of the Rat as an Assay for Anti-inflammatory Drugs, Proceedings of the Society for Experimental Biology and Medicine, 111, 544 (1962). The compound under investigation was given orally to the rat at a dose of 100 mg./kg., unless indicated otherwise, and one hour later carrageenin was injected subcutaneously into one paw. Three hours later the degree of edema was measured volumetrically by fluid displacement and compared to that of the control paw to give a result presented in terms of percentage inhibition of edema. Any result of more than 30% inhibition was greater than three times the standard deviation of the result in control animals and thus clearly indicated anti-inflammatory activity.

The percentage inhibition of edema observed with standard compounds at the same dosage was aspirin, 24%; phenylbutazone, 55%; and flufenamic acid, 47%.

In the test described above the compound of the present invention having the formula

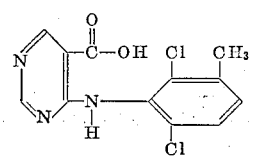

gave about 40–50% inhibition of edema when tested at a dose of 150 mgm./kg. and about 35% at 75 mgm./kg.

This result was surprising in view of the fact that no significant inhibition of edema was produced by the corresponding compound lacking any substituents on the benzene ring or by the corresponding compounds containing on the benzene ring only a single methyl or chloro group.

The following examples will serve to illustrate but not to limit the present invention. All temperatures are given in degrees centigrade.

*Example 1*

5 - carboxy - 4 - (2,6-dichloro-3-methylanilino)pyrimidine.—A solution of 2,6-dichloro-3-methylaniline (Brimelow et al., J. Chem. Soc. 1208 (1951)), (10.3 g., 0.0585 mole) in dry dimethylformamide (40 ml.) was added rapidly to a stirred suspension of sodium hydride (2.4 g. of a 58.6% sodium hydride dispersion in mineral oil, 0.0585 mole of sodium hydride) in dry dimethylformamide (30 ml.). The mixture was heated to 60° and was kept at this temperature until the evolution of hydrogen ceased. The temperature of the mixture was then raised to 120° when a solution of 4-chloro-5-ethoxycarbonylpyrimidine (Bredereck et al., Chem. Ber. 95, 803 (1962)), (10.9 g., 0.0585 mole) in dry dimethylformamide (40 ml.) was added dropwise. The reaction mixture was then heated at 120° for three hours.

The dimethylformamide was removed from the cooled reaction mixture in a rotating evaporator. The residue, a dark brown viscous oil, was suspended in a solution consisting of water (70 ml.), ethanol (30 ml.), and potassium hydroxide (15.0 g.). The suspension was heated under reflux for 2.5 hours. Most of the ethanol was then removed from the mixture in a rotating evaporator. Water (150 ml.) was added to the residue and the aqueous mixture washed three times with chloroform (100 ml. each portion). The resulting aqueous solution was treated at its boiling point with decolorizing carbon, then filtered while hot. The cooled filtrate was acidified to pH 2 with concentrated hydrochloric acid. The precipitated light brown solid was collected and dried. This crude 5-carboxy-4-(2,6-dichloro-3-methylanilino)pyrimidine (2.1 g.) had an M.P. of 266–268° (dec.). The product was recrystallized from methanol (with treatment with decolorizing carbon) to give small white crystals, M.P. 280–280.5° (dec.).

*Analysis.*—Calc'd for $C_{12}H_9Cl_2N_3O_2$: C, 48.34; H, 3.04; Cl, 23.79; N, 14.09. Found: C, 48.78; H, 3.14; Cl, 23.38; N, 13.91.

*Example 2*

5-carbethoxy-4-ethoxypyrimidine.—This compound can be prepared according to Bredereck et al., Chem. Ber. 95, 956–963 (1962) who reported B.P. 87° C./0.23 mm. In the present work it was prepared in the following manner.

5-carbethoxy-4-chloropyrimidine (63.0 g., 0.338 mole) was washed into a Parr hydrogenation bottle with 100 ml. ethanol. After one or two minutes the solution became very hot and boiled while giving off fumes of HCl. Obviously solvolysis had occurred. Triethylamine (34.6 g., 48 ml., 0.338 mole) was added and a copious precipitate (presumably triethylamine hydrochloride) was observed. To this mixture there was added about one gram of Pd/C catalyst and the resulting mixture was subjected to hydrogenation for 7 hours. No hydrogen was absorbed. After filtration and removal of the solvent the residue was dissolved in ether and the ethereal solution was filtered and the ether removed from the filtrate to leave an orange oil which was distilled in vacuo to obtain 28.7 g. 5-carbethoxy-4-ethoxypyrimidine, B.P. 75–80°/0.2–0.18 mm.

A sample purified by evaporative distillation at 60°/0.2 mm. was analyzed.

*Analysis.*—Calc'd for $C_9H_{12}N_2O_3$: C, 55.09; H, 6.17; N, 14.28. Found: C, 54.20; H, 6.07; N, 15.35.

The material solidified on standing, M.P. 28–30° C.

5-carboxy-4-ethoxypyrimidine.—5-carbethoxy-4-ethoxypyrimidine (5.0 g., 0.0255 mole) and 1.0 g. NaOH in 60 ml. water were combined, found to be immiscible and stirred vigorously for 30 minutes at room temperature. As hydrolysis occurred the non-aqueous layer disappeared. Acidification with hydrochloric acid gave a granular, white precipitate of 5-carbethoxy-4-ethoxypyrimidine which was collected by filtration, dried and found to weigh 2.40 g., 56% yield. The product melted at 162–164° C. after recrystallization from absolute ethanol.

*Analysis.*—Calc'd for $C_7H_8N_2O_3$: C, 50.00; H, 4.80; N, 16.66. Found: C, 50.25; H, 5.10, 4.57; N, 16.62.

5 - carboxy - 4-(2,6-dichloro-3-methylanilino)pyrimidine.—The sodium salt of 5-carboxy-4-ethoxypyrimidine was prepared by warming a solution of the acid (16.8 g., 0.1 mole) in dry hexamethylphosphoric triamide (110 ml.) with sodium hydride (4.1 g. of a 58.6% sodium hydride dispersion in mineral oil, 2.4 g. of sodium hydride, 0.1 mole) at 60–80° C. under an atmosphere of nitrogen until the evolution of hydrogen ceased.

Likewise, the sodium salt of 2,6-dichloro-3-methylaniline (also named 3-amino-2,4-dichlorotoluene; H. C. Brimelow et al., J. Chem. Soc. 1208 (1951)) was prepared by warming a solution of the amine (17.6 g., 0.1 mole) in hexamethylphosphoric triamide (110 ml.) with sodium hydride (4.1 g. of a 58.6% sodium hydride dispersion) at 50–60° C. under an atmosphere of nitrogen until the evolution of hydrogen ceased and a clear solution was obtained.

The solution of the amine salt was added to the suspension of the pyrimidine acid salt and the mixture heated at about 120° C. with stirring under an atmosphere of nitrogen for 18 hours.

Most of the hexamethylphosphoric triamide was removed from the reaction mixture under reduced pressure. The residue was added to cold water, and this aqueous mixture was washed with "Skellysolve B" (B.P. 60–80° C.). The resulting aqueous solution was acidified with 10% aqueous hydrochloric acid. The precipitated solid was collected, washed with cold water and partially dried. The damp product was crystallized from ethanol to give several crops of 5-carboxy-4-(2,6-dichloro-3-methylanilino)pyrimidine with a total yield of 14.5 g. The first crop (8.0 g.) had M.P. 280–282°.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. A member selected from the group consisting of the acid of the formula

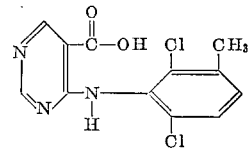

and nontoxic, pharmaceutically acceptable salts thereof.
2. The acid of the formula

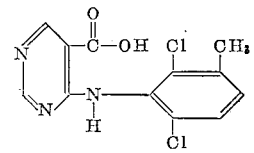

No references cited.

ALEX MAZEL, *Primary Examiner.*

M. U. O'BRIEN, *Assistant Examiner.*

UNITED STATES PATENT OFFICE
CERTIFICATE OF CORRECTION

Patent No. 3,300,496　　　　　　　　　　　　　　January 24, 1967

Peter F. Juby

It is hereby certified that error appears in the above numbered patent requiring correction and that the said Letters Patent should read as corrected below.

Column 2, line 68, for "40-50%" read -- 40-59% --; column 4, line 72, strike out "No references cited." and insert the following:

References Cited by Applicant

| | | |
|---|---|---|
| Nickell | 3,118,754 | January 21, 1964 |
| Scherrer | 3,138,636 | June 23, 1964 |
| Jones | 3,144,387 | August 11, 1964 |

Peters et al., J. Org. Chem. 25, 2137-2142 (1960).
Patent Journal (Republic of South Africa) page 22, (October 18, 1961).
Patent Journal (Republic of South Africa) page 25, (January 24, 1962).
R. A. Scherrer, C. V. Winder and S. W. Short, Abstracts of Ninth National Medicinal Chemistry Symposium of the American Chemical Society, Minneapolis, Minn., June 21-24, 1964, pages 11a-11i.

Signed and sealed this 17th day of October 1967.

(SEAL)
Attest:

EDWARD M. FLETCHER, JR.　　　　　　　　EDWARD J. BRENNER
Attesting Officer　　　　　　　　　　　　Commissioner of Patents